April 16, 1940.  C. B. McCLURE  2,197,586
WATER TEMPERATURE CONTROL VALVE
Filed Nov. 13, 1936   2 Sheets-Sheet 1
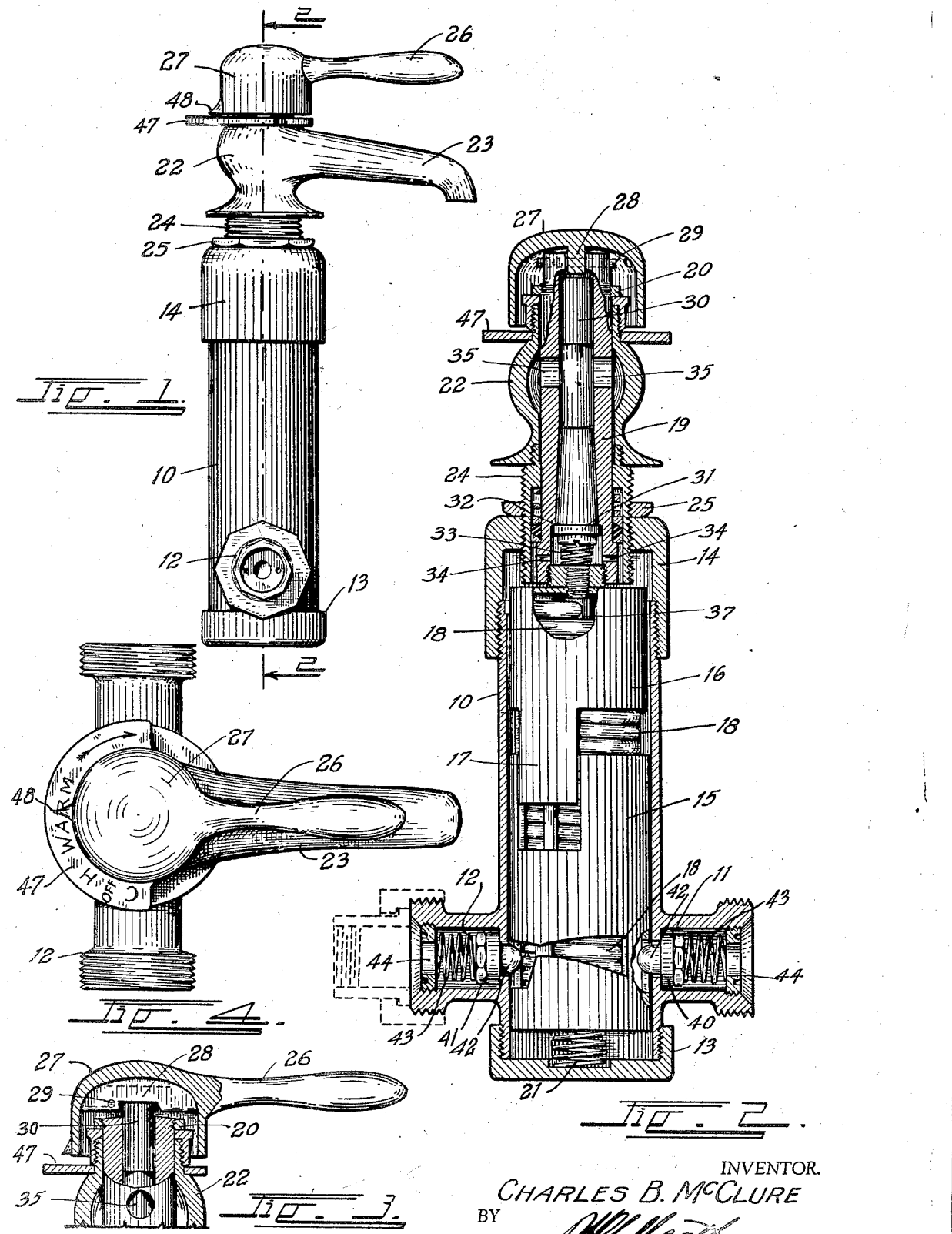
INVENTOR.
CHARLES B. McCLURE
BY
ATTORNEY.

April 16, 1940.   C. B. McCLURE   2,197,586
WATER TEMPERATURE CONTROL VALVE
Filed Nov. 13, 1936    2 Sheets-Sheet 2
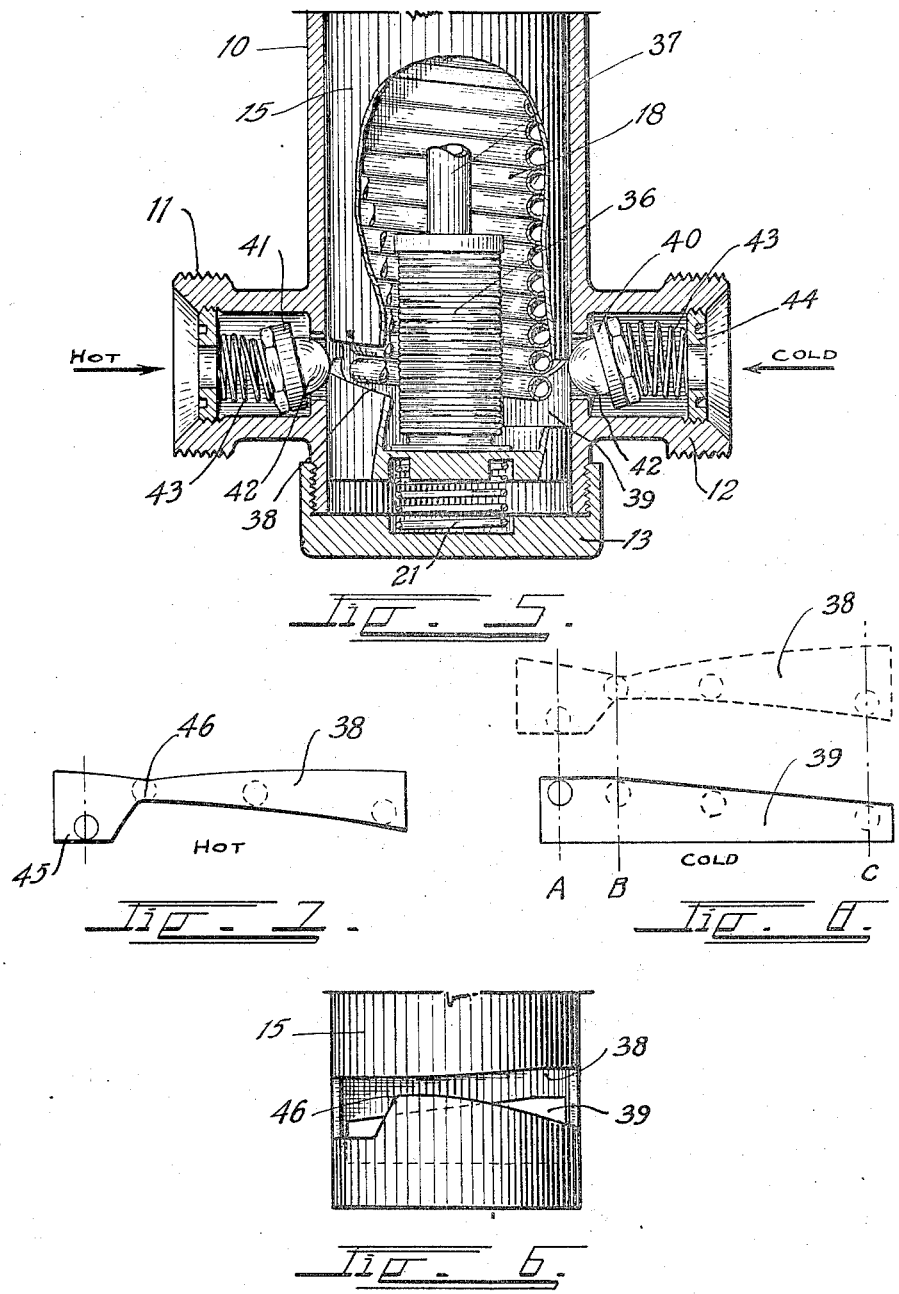
INVENTOR.
CHARLES B. McCLURE
BY
ATTORNEY.

Patented Apr. 16, 1940

2,197,586

UNITED STATES PATENT OFFICE 2,197,586

WATER TEMPERATURE CONTROL VALVE

Charles B. McClure, Denver, Colo.

Application November 13, 1936, Serial No. 110,630

7 Claims. (Cl. 236—12)

This invention relates to an automatic temperature control valve for household plumbing fixtures, such as lavoratories, shower baths, etc., and has for its principal object the provision of a control valve which can be set to deliver water at any desired temperature, and which will automatically maintain the water at this temperature, regardless of fluctuations in the hot and cold water supplies. This application is more particularly designed to cover improvements over the device shown in applicant's copending application, Serial No. 64,505, now Patent No. 2,106,929 dated Feb. 1, 1938, of which the present application is a continuation in part.

Another object of the invention is to provide an operating handle for such a valve which, when moved in one direction, regulates the water temperature, and when moved in another direction, regulates the amount of flow so that both the temperature and quantity are controlled by the operation of a single handle.

Other objects and advantages reside in the detail construction of the invention, which is designed for simplicity, economy, and efficiency. These will become more apparent from the following description.

In the following detailed description of the invention reference is had to the accompanying drawings which forms a part hereof. Like numerals refer to like parts in all views of the drawings and throughout the description.

In the drawings:

Fig. 1 is a side elevation of one form of the improved valve.

Fig. 2 is an enlarged vertical section therethrough taken on the line 2—2, Fig. 1.

Fig. 3 is a detail section through the operating handle.

Fig. 4 is a plan view of the operating handle, and its indicating shield.

Fig. 5 is a detail section through the lower portion of the valve and control sleeve.

Fig. 6 is a detail view of the lower extremity of the control sleeve.

Fig. 7 is a diagram illustrating the contour or outline of the hot water valve slot.

Fig. 8 is a similar diagram of the cold water valve slot with the outline of the hot water valve slot superimposed thereover.

The invention comprises a tubular housing 10, formed with a hot water inlet nipple 11 and cold water inlet nipple 12. The rear or bottom of the housing is closed by means of a screw cap 13 and the front or top is closed by means of a cap member 14. The lower control sleeve 15 is rotatably mounted within the housing. An upper sleeve 16 is dove-tailed into the lower control sleeve by means of suitable tenons 17 so that the two rotate as a unit.

The lower sleeve 15 and the upper sleeve 16 are connected together by means of an axial tube 37 and an expansible thermostatic bellows 36 so that expansion of the bellows 36 acts to force the control sleeve 15 downwardly away from the sleeve member 16. The bellows receives its expansive fluid from the tube 37 which is connected at its top with a closed tubing coil 18 positioned within the sleeves. The entire assembly of sleeves, coil, bellows, etc., is suspended from a hollow rotatable valve stem 19. The valve stem 19 is in turn supported from a lock nut 20 threaded on the upper extremity of the valve stem 19. A compression spring 21 on the cap 13 assists in supporting the lower sleeve against the bellows 36.

A faucet body 22 having the usual faucet spout 23 is supported upon a collar 24 threaded through the cap 14. The supporting nut 20 rests upon the upper extremity of the faucet body 22.

An enclosing cap 27 on an operating handle 26 encloses the upper extremity of the valve stem 19. The cap portion 27 is formed with an internal rib 28 which fits into a suitable notch or groove in the upper extremity of the stem 19. The rib 28 is pivoted within this groove on a suitable pivot pin 29 positioned to one side of the axial center line.

A push rod 30 extends upwardly within the valve stem 19 and projects above the top thereof into contact with the rib 28 of the handle. The lower extremity of the push rod carries a valve washer 31 which is constantly forced against a seat 32 in the stem 19 by means of a compression spring 33.

By pressing downwardly on the handle 26, the rib 28 is brought into contact with the upper extremity of the push rod 30, thereby acting to force the valve 31 from its seat 32 to allow water to flow from the interior of the housing 10, through ports 34, past the valve 31 into the hollow stem 19, thence through discharge ports 35 into the faucet body 22 and from the spout 23. Therefore it can be readily seen that depression of the handle 26 opens and closes the flow from the housing 10.

Rotation of the handle 26 acts to rotate the sleeves 15 and 16. The amount of rotation can be determined by means of a pointer 48 on the handle 26 which indicates positions on a scale shield 47 on the faucet housing.

The lower control sleeve 15 is formed with slots in its opposite sides of irregular contour. These slots will be herein designated the hot water slot 38 and cold water slot 39. These slots coact with rounded stems 42 on tilting valve members 40 and 41, positioned in the hot and cold inlet nipples 11 and 12, respectively. The stems 42 project into the interior of the housing 10 and into the slots 38 and 39. The valves are constantly forced against seats in the housing 10 by means of suitable compression springs 43 which are held in the nipples by threaded spring washers 44. It can be readily seen that as the slots 38 and 39 move out of alignment with the stems 42, the slot edges will act against the latter to tilt and push the valves from their seats as shown in Fig. 5.

The slot 38 opposite the hot water nipple 12 is contoured as shown in Fig. 7 with a low bottom edge 45 adjacent one extremity which rises to a high point 46, thence gradually lowers toward the other extremity. The slot 38 becomes narrower opposite the high point 46 and wider at both extremities. The cold water slot 39 diagrammed in Fig. 8 has a horizontal bottom edge and an inclined upper edge. In Fig. 8, the slots 38 and 39 have been diagrammatically superimposed upon each other so as to illustrate the relative positions of the stems 42 at various positions of the sleeve 15.

Let us assume that the sleeve 15 is in the "off" position. At this time, the two stems are positioned in their respective slots as were indicated by the line A. Both stems are out of contact with their respective slot edges so that the valves 40 and 41 are resting upon their seats and no water is flowing to the housing 10.

Let us assume that the handle 26 is turned slightly to the left, that is to the C or "cold" position on the indicating dial 47. This brings the left extremity of the slot 39 against the stem 42 on the cold water valve 40, tilting or wedging it from its seat so as to allow cold water to flow to the housing 10. Since the extremity of the hot water slot 38 is positioned further to the left, it does not contact its valve stem so that the hot water valve 41 remains closed.

Let us assume that the handle 26 is now turned to the left so as to bring the indicator 48 opposite the H or the "hot" position. This brings the slots and protuberances into alignment as indicated by the line B in Fig. 8. At this time, the high point 46 of the slot 38 and the narrow portion of this slot has been brought directly under the stem 42 on the hot water valve 41, forcing the valve completely from its seat so as to allow a full flow of the hot water into the housing 10. The stem on the cold water valve 40 has not yet contacted the inclined edge on its slot 39 so that it remains closed. Thus, only hot water is flowing into the housing 10.

Let us assume that the handle 26 is turned further toward the right toward the "warm" indication. This brings the gradually widening portion of the slot 38 beneath the hot water valve 44, allowing it to gradually close. It also brings the inclined edge of the slot 39 against the stem on the cold water valve 40, allowing it to gradually open so that the farther the handle is turned to the right, the colder the water will become until the extremities of the slots are reached as indicated by the line C in Fig. 8. At this time, the cold water valve is forced almost completely from its seat while the hot water valve, due to the wide extremity of the slot 38, has been allowed to almost close.

The above describes the manual operation of the valve. The thermostatic operation will now be described. Let us assume that the sleeves are in an intermediate position between the lines B and C and the water is flowing at the desired temperature. If for some reason, the hot water supply should be decreased, such as by the opening of the other valves on the supply line, the water entering the housing 10 will become chilled, and will cause the bellows 36 to contract. This raises the control sleeve 15, causing the lower edge of the hot water slot 38 to contact the hot water valve and tilt it still further from its seat. It also pulls the upper edge of the cold water slot 39 away from the stem of the cold water valve 42, allowing it to approach a closed position, thus increasing the supply of hot water and decreasing the supply of cold water in proportion to the drop in temperature within the housing 10.

On the other hand, should the cold water supply drop or should the hot water supply increase so as to raise the temperature within the housing, the bellows 36 will be expanded to lower the control sleeve 15 against the compression of the spring 21. This will act to bring the upper edge of the cold water slot against the stem of the cold water valve tilting the latter further from the set, thus increasing the supply of cold water. It will also result in pulling the lower edge of the hot water slot 38 away from the hot water valve to allow it to tend to close off the incoming hot water in exact proportion to the increased temperature in the housing 10. Thus, we have at all times, an automatic maintenance of the temperature to which the control sleeve is initially set.

The position of the control sleeve 15 can be regulated to suit conditions at the time of installation by threading the sleeve 24 in or out of the cap 14. When the proper position has been reached, the sleeve is locked by means of a suitable lock nut 25.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:

1. A thermostatically controlled mixing valve comprising: a cylindrical housing; means for discharging water from one extremity of said housing; a cold water inlet; a hot water inlet; said inlets opening through the cylindrical side wall of said housing and at opposite sides thereof; a spring-closed, outwardly opening cold water valve in the cold water inlet; a similar hot water valve in the hot water inlet; a head on each valve projecting axially inward into said housing from the interior cylindrical wall; a movable sleeve snugly fitting the inner cylindrical wall of said housing, there being a circumferentially extending opening at each side of said sleeve for the reception of said heads; and thermostatically operated means for reciprocating said sleeve axially in said housing; the relation of said openings being such that as said sleeve moves upwardly, the lower edge of one opening will tilt the hot water valve from its seat while the upper edge of the other opening moves from the head on the cold water valve to allow it to close.

2. A thermostatically controlled mixing valve comprising: a cylindrical housing; means for discharging water from one extremity of said housing; a cold water inlet; a hot water inlet;

said inlets opening through the cylindrical side wall of said housing and at opposite sides thereof; a spring-closed, outwardly opening cold water valve in the cold water inlet; a similar hot water valve in the hot water inlet; a head on each valve projecting axially inward into said housing from the interior cylindrical wall; a movable sleeve snugly fitting the inner cylindrical wall of said housing, there being a circumferentially extending opening at each side of said sleeve for the reception of said heads; thermostatically operated means for reciprocating said sleeve axially in said housing; and manual means for rotating said sleeve, the relation of said circumferential openings being such that as said sleeve moves downwardly the lower edge of one opening will move from the head on the hot water valve to allow it to close while the upper edge on the other opening moves against the head on the cold valve to tilt said valve from its seat, the two described edges being spirally inclined so that when said sleeve is rotated in one direction the said lower edge will tilt the hot water valve to approach the open position while the said upper edge will allow the cold water valve to approach the closed position.

3. A thermostatically controlled mixing valve comprising: a cylindrical housing; means for discharging water from one extremity of said housing; a cold water inlet; a hot water inlet, said inlets opening through the cylindrical side wall of said housing and at opposite sides thereof; a spring-closed, outwardly opening cold water valve in the cold water inlet; a similar hot water valve in the hot water inlet; a head on each valve projecting axially inward into said housing from the interior cylindrical wall; a movable sleeve snugly fitting the inner cylindrical wall of said housing, there being a circumferentially extending opening at each side of said sleeve for the reception of said heads; thermostatically operated means for reciprocating said sleeve axially in said housing; the relation of said openings being such that as said sleeve moves upwardly the lower edge of one opening will tilt the hot water valve from its seat while the upper edge of the other opening moves from the head on the cold water valve to allow it to close; and means for manually shifting said sleeve axially to properly position said openings in relation to said valves.

4. A thermostatically controlled mixing valve comprising: a cylindrical housing; a cold water inlet on one side of said housing; a hot water inlet on another side of said housing; valve seats in said inlets; mushroom-like valves seated on said seats; springs for urging said valves against their seats; projecting portions on said valves extending radially within said housing; a sleeve supported in said housing; circumferentially extending slots in said sleeve normally positioned opposite said valves, said slots being contoured so that when said sleeve is rotated in one direction the lower edge of one slot will tilt the hot water valve upwardly as the upper edge of the slot tilts the cold water valve downwardly; and manual means for rotating said sleeve.

5. A thermostatically controlled water mixing valve comprising: a cylindrical housing; a hot water inlet valve; a cold water inlet valve, said valves controlling the admission of water to said housing; means for discharging water from said housing; an operating stem member extending from each of said valves radially into said housing; a sleeve fitted within said housing; thermostatic means for forcing said sleeve downwardly as the temperature therein rises; spring means for forcing said sleeve upwardly as said temperature falls; a hot water slot in said sleeve opposite said hot water valve; a cold water slot in said sleeve opposite said cold water valve, said stem members projecting into said slots, the upper and lower edges of said slots being so arranged in relation to each other and to said stem members that when said sleeve moves upwardly said hot water valve will be forced open as said cold water valve closes.

6. A thermostatically controlled water mixing valve comprising: a cylindrical housing; a hot water inlet valve; a cold water inlet valve, said valves controlling the admission of water to said housing; means for discharging water from said housing; an operating stem member extending from each of said valves radially into said housing; a sleeve fitted within said housing; thermostatic means for forcing said sleeve downwardly as the temperature therein rises; spring means for forcing said sleeve upwardly as said temperature falls; a hot water slot in said sleeve opposite said hot water valve; a cold water slot in said sleeve opposite said cold water valve, said stem members projecting into said slots, the upper and lower edges of said slots being so arranged in relation to each other and to said stem member that when said sleeve moves downwardly said hot water valve will close as said cold water valve is forced open.

7. A thermostatically controlled water mixing valve comprising: a cylindrical housing; a hot water inlet valve; a cold water inlet valve, said valves controlling the admission of water in said housing; means for discharging water from said housing; an operating stem member extending from each of said valves radially into said housing; a sleeve fitted within said housing; manual means for rotating said sleeve; a hot water slot in said sleeve opposite said hot water valve; a cold water slot in said sleeve opposite said cold water valve, said stem members projecting into said slots, the lower edge of the hot water slot and the upper edge of the cold water slot being similarly inclined so that rotation of said sleeve will move said valves in opposite directions; and thermostatic means for moving said sleeve axially to cause said edges to operate said valves at any position of rotation.

CHARLES B. McCLURE.